(12) United States Patent
McMillen et al.

(10) Patent No.: US 11,078,124 B2
(45) Date of Patent: Aug. 3, 2021

(54) SYSTEMS AND METHODS FOR MAKING CERAMIC POWDERS

(71) Applicant: ALCOA USA CORP., Pittsburgh, PA (US)

(72) Inventors: James C. McMillen, Pittsburgh, PA (US); Lance M. Sworts, New Kensington, PA (US); Benjamin D. Mosser, Pittsburgh, PA (US); Charles Robert Shanta, III, Pittsburgh, PA (US)

(73) Assignee: ALCOA USA CORP., Pittsburgh, PA (US)

( * ) Notice: Subject to any disclaimer, the term of this patent is extended or adjusted under 35 U.S.C. 154(b) by 0 days.

(21) Appl. No.: 16/241,517

(22) Filed: Jan. 7, 2019

(65) Prior Publication Data
US 2019/0135703 A1    May 9, 2019

Related U.S. Application Data

(63) Continuation of application No. PCT/US2017/041057, filed on Jul. 7, 2017.
(Continued)

(51) Int. Cl.
*C04B 35/626* (2006.01)
*C04B 35/58* (2006.01)
(Continued)

(52) U.S. Cl.
CPC .......... *C04B 35/626* (2013.01); *B01J 8/085* (2013.01); *B01J 8/087* (2013.01); *B01J 8/10* (2013.01);
(Continued)

(58) Field of Classification Search
CPC .............. C04B 35/626; C04B 35/6261; C04B 35/62645; C04B 35/56; C04B 35/58;
(Continued)

(56) References Cited

U.S. PATENT DOCUMENTS

| 4,266,977 A | 5/1981 | Steiger |
| 4,275,026 A | 6/1981 | Hazel et al. |

(Continued)

FOREIGN PATENT DOCUMENTS

| DE | 202014102701 | * | 1/2015 | ............ C04B 38/04 |
| EP | 0177092 | | 4/1986 | |

(Continued)

OTHER PUBLICATIONS

International Search Report and Written Opinion, dated Sep. 22, 2017, from corresponding International Patent App. No. PCT/US2017/041057.

(Continued)

*Primary Examiner* — Jun Li
(74) *Attorney, Agent, or Firm* — Greenberg Traurig, LLP

(57) ABSTRACT

Systems and methods for making ceramic powders configured with consistent, tailored characteristics and/or properties are provided herein. In some embodiments a system for making ceramic powders, includes: a reactor body having a reaction chamber and configured with a heat source to provide a hot zone along the reaction chamber; a sweep gas inlet configured to direct a sweep gas into the reaction chamber and a sweep gas outlet configured to direct an exhaust gas from the reaction chamber; a plurality of containers, within the reactor body, configured to retain at least one preform, wherein each container is configured to permit the sweep gas to flow therethrough, wherein the preform is configured to permit the sweep gas to flow there through, (Continued)

such that the precursor mixture is reacted in the hot zone to form a ceramic powder product having uniform properties.

11 Claims, 7 Drawing Sheets

Related U.S. Application Data

(60) Provisional application No. 62/360,079, filed on Jul. 8, 2016.

(51) Int. Cl.
| | |
|---|---|
| *B01J 8/08* | (2006.01) |
| *C04B 35/56* | (2006.01) |
| *B01J 8/10* | (2006.01) |
| *C22C 29/02* | (2006.01) |
| *C04B 35/65* | (2006.01) |
| *C22C 29/14* | (2006.01) |
| *C22C 29/00* | (2006.01) |

(52) U.S. Cl.
CPC .............. *C04B 35/56* (2013.01); *C04B 35/58* (2013.01); *C04B 35/5805* (2013.01); *C04B 35/58021* (2013.01); *C04B 35/58071* (2013.01); *C04B 35/6261* (2013.01); *C04B 35/62645* (2013.01); *C04B 35/65* (2013.01); *C22C 29/00* (2013.01); *C22C 29/02* (2013.01); *C22C 29/14* (2013.01); *B01J 2208/0053* (2013.01); *B01J 2208/0092* (2013.01); *B01J 2208/00168* (2013.01); *B01J 2208/00495* (2013.01); *B01J 2208/00557* (2013.01); *B01J 2208/00814* (2013.01); *B01J 2219/182* (2013.01); *B01J 2219/185* (2013.01); *B01J 2219/187* (2013.01); *B01J 2219/192* (2013.01); *B01J 2219/1923* (2013.01); *B01J 2219/1928* (2013.01); *B01J 2219/1943* (2013.01); *C04B 2235/3232* (2013.01); *C04B 2235/3409* (2013.01); *C04B 2235/422* (2013.01); *C04B 2235/48* (2013.01); *C04B 2235/6567* (2013.01); *C04B 2235/74* (2013.01); *C04B 2235/95* (2013.01)

(58) Field of Classification Search
CPC .......... C04B 35/58071; C04B 35/5805; C04B 35/58021; C04B 2235/422; C04B 2235/48; C04B 2235/6567; C04B 2235/3409; C04B 2235/3232; B01J 2208/00814; B01J 4/007
See application file for complete search history.

(56) References Cited

U.S. PATENT DOCUMENTS

| | | | | |
|---|---|---|---|---|
| 4,353,885 A | * | 10/1982 | Hoekje | B01J 4/001 204/164 |
| 4,610,864 A | | 9/1986 | Kuramoto et al. | 423/344 |
| 4,784,978 A | * | 11/1988 | Ogasawara | C01B 21/0648 501/96.4 |
| 4,818,511 A | | 4/1989 | Nishi et al. | 423/344 |
| 4,983,553 A | | 1/1991 | Dunn et al. | |
| 5,100,845 A | | 3/1992 | Montgomery | |
| 5,112,579 A | | 5/1992 | Dunn et al. | 422/198 |
| 5,160,716 A | | 11/1992 | Logan | |
| 5,190,738 A | * | 3/1993 | Parent | C30B 25/00 423/412 |
| 5,194,234 A | | 3/1993 | Weimer et al. | |
| 5,350,545 A | * | 9/1994 | Streckert | C04B 35/80 156/89.27 |
| 5,382,405 A | * | 1/1995 | Lowrance, II | B22F 3/23 264/434 |
| 8,211,278 B2 | | 7/2012 | Weirauch, Jr. et al. | |
| 8,216,536 B2 | | 7/2012 | McMillen | |
| 2008/0029886 A1 | | 2/2008 | Cotte et al. | |
| 2011/0104033 A1 | * | 5/2011 | McMillen | C01B 35/04 423/297 |
| 2012/0244057 A1 | | 9/2012 | McMillen | |
| 2013/0167374 A1 | * | 7/2013 | Kirby | B32B 18/00 29/888.02 |
| 2013/0330256 A1 | | 12/2013 | Weaver et al. | |
| 2015/0218055 A1 | | 8/2015 | McMillen et al. | |
| 2016/0052795 A1 | | 2/2016 | Weaver et al. | |
| 2017/0036919 A1 | | 2/2017 | McMillen | |
| 2018/0009717 A1 | | 1/2018 | Mosser et al. | |
| 2018/0029886 A1 | * | 2/2018 | McMillen | C04B 35/583 |

FOREIGN PATENT DOCUMENTS

| | | |
|---|---|---|
| EP | 0272377 A2 | 6/1988 |
| JP | S42-24669 | 11/1967 |
| WO | WO02/066374 A1 | 8/2002 |
| WO | WO2016/049362 A2 | 3/2016 |

OTHER PUBLICATIONS

Blokhina, I. A., et al. "Carbothermal Synthesis of $TiB_2$ Powders of Micron Size",*Inorganic Materials* 52(6):550-557 (2016).
Degrave, I. E., et al., "Composite Powders of the $TiC$—$TiB_2$ System", *Glass and Ceramics* 57(11-12):396-398 (2002).
Kang, S.H., et al., "Synthesis of nano-titanium diboride powders by carbothermal reduction" *Journal of the European Ceramic Society* 27:715-718 (2007).
Saito, T., et al., "Synthesis of ultrafine titanium diboride particles by rapid carbothermal reduction in a particulate transport reactor" *Journal of Materials Science* 32:3933-3938 (1997).
Subramanian, C., et al., "Synthesis and consolidation of titanium diboride", *International Journal of Refractory Metals & Hard Materials* 25:345 (2007).
Welham, N. J., "Mechanical enhancement of the carbothermic formation of $TiB_2$", *Metallurgical and Materials Transactions A* 31A:283-289 (Jan. 2000).
Yu, J., et al.. "Carbothermal reduction synthesis of $TiB_2$ ultrafine powders",*Ceramics International* 42(3):3916-3920 (Feb. 15, 2016).

\* cited by examiner

SYSTEMS AND METHODS FOR MAKING CERAMIC POWDERS

CROSS-REFERENCE TO RELATED APPLICATIONS

This application is a continuation of International Patent Application No. PCT/US2017/041057, filed Jul. 7, 2017, which claims benefit of U.S. provisional application No. 62/360,079, filed Jul. 8, 2016, each of which is herein incorporated by reference in its entirety.

FIELD OF THE INVENTION

Broadly, the invention relates to systems and methods of making ceramic powders. More specifically, the present disclosure relates to carbothermically synthesizing various ceramic powders in a continuous reactor such that the resulting ceramic powder product is configured with consistent, tailored characteristics and/or properties.

BACKGROUND

Through carbothermic synthesis, it is possible to make various boride, nitride, and/or carbide ceramic powders. The ceramic powders can then be processed into final ceramic products for a wide variety of applications.

SUMMARY OF THE INVENTION

In one aspect of the instant disclosure, a system comprises: a reactor body having a first end and a second end, wherein the reactor body is configured with an inner sidewall extending from the first end to the second end to define a reaction chamber; wherein the reactor body is configured with a heat source to provide a hot zone along the reaction chamber; a sweep gas inlet adjacent to the first end and configured to direct a sweep gas into the reaction chamber and a sweep gas outlet adjacent to the second end and configured to direct an exhaust gas from the reaction chamber; a plurality of containers configured in a sequentially aligned arrangement within the reactor body, wherein each container is configured to retain at least one preform, wherein each container is configured to permit the sweep gas to flow there through, wherein each preform is configured from a mixture of precursor materials for a carbothermic reaction, wherein the preform is configured to permit the sweep gas to flow there through, such that the precursor mixture is reacted in the hot zone to form a ceramic powder product having uniform properties.

In some embodiments, the reactor body is configured one of vertically or horizontally.

In some embodiments, the reactor body is configured at an angle, with the first end at a different height than the second end.

In some embodiments, the reactor further comprises a staging area configured adjacent to and in communication with the first end between a reactor inlet and a first seal, wherein the staging area is configured to accept at least one container, further wherein the staging area is configured with a valve such that a pressure differential is introduced throughout the staging area to remove and/or add gaseous species from the staging area.

In some embodiments, the staging area comprises a heat source configured to preheat the container and the preform.

In some embodiments, the system further comprises: a first seal on the first end of the reactor body, wherein the first seal is configured to provide a sealed reaction chamber adjacent to the first end; and a second seal on the second end of the reactor body to provide a sealed reaction chamber adjacent to the second end.

In some embodiments, an outer diameter of the container is less than an inner diameter of the reactor body.

In some embodiments, each of the plurality of containers is configured to support the weight of a plurality of stacked containers equipped with preforms.

In some embodiments, each of the plurality of containers comprises at least one end and a sidewall perimetrically surrounding and extending from the end.

In some embodiments, at least one of the ends and the container are configured with a mechanical device configured to attach the container sidewall to the end.

In some embodiments, at least one of the container sidewall or the container end is configured with apertures.

In some embodiments, the system is configured for repeated container insertion and removal from the reactor body.

In some embodiments, the preform is in a form selected from the group consisting of: a sphere, a rod, a plate, a brick, a block, a tetrahedron, a torus, a tube, and combinations thereof.

In some embodiments, the preform is selected from the group consisting of: a compacted solid form, an extruded form, a molded form, a cast form, and combinations thereof In some embodiments, the preform is configured to the height of the container.

In some embodiments, the preform is configured in a stacked vertical configuration within the container.

In some embodiments, the preform is configured as a rigid body with a porosity configured to permit the sweep gas to permeate through the preform body.

In one aspect of the instant disclosure, a method for making ceramic powder, comprises: providing an at least one preform to a reactor, the reactor comprising: a reactor body having a first end and a second end, wherein the reactor body is configured with an inner sidewall extending from the first end to the second end to define a reaction chamber; wherein the reactor body is configured with a heat source to provide a hot zone along the reaction chamber; a plurality of containers configured in sequentially aligned arrangement within the reactor body, wherein each container is configured to retain at least one preform, wherein each container is configured to permit the sweep gas to flow there through, wherein each preform is configured from a mixture of precursor materials for a carbothermic reaction, directing a sweep gas from the first end through the at least one preform and into the second end; concomitant with the directing the sweep gas step, carbothermically reacting the at least one preform in the reactor body; and forming a ceramic powder configured with uniform properties.

In some embodiments, the method further comprises preparing a precursor mixture.

In some embodiments, the method further comprises forming the preform from the precursor mixture.

In some embodiments, the forming step includes at least one of: compacting the preform mixture; molding the precursor mixture, casting the precursor mixture, extruding the precursor mixture, and combinations thereof.

In some embodiments, preparing the precursor mixture further includes one of: (a) forming a wet agglomerate having the reagents therein, or (b) dry processing the reagents with compatible materials and/or binders.

In some embodiments, the method further comprises processing the precursor mixture into a preform.

In some embodiments, the processing step includes at least one of: dehydrating the preform, curing the preform, demolding the preform, and combinations thereof.

In some embodiments, the preform is configured as a body to promote uniform heat transfer and promote communication of off gases from the preform.

In some embodiments, the method further comprises: flowing the sweep gas (i) through the preform body; (ii) around the preform body; and combinations thereof.

In one aspect of the instant disclosure, a system, comprises: a reactor body having a first end and a second end, wherein the reactor body is configured with an inner sidewall extending from the first end to the second end to define a reaction chamber; wherein the reactor body is configured with a heat source to provide a hot zone along the reaction chamber; a sweep gas inlet adjacent to the first end and configured to direct a sweep gas into the reaction chamber and a sweep gas outlet adjacent to the second end and configured to direct an exhaust gas from the reaction chamber; a plurality of preforms configured in a sequentially aligned arrangement within the reactor body, wherein each preform is configured with (1) at least one gas channel configured to extend from the top to the bottom of the preform, parallel to the direction of gas flow; and (2) a plurality of voids defining a porosity within the preform body sufficient to permit the sweep gas to flow therethrough; wherein each preform is configured from a mixture of precursor materials for a carbothermic reaction, such that the precursor mixture is reacted in the hot zone to form a ceramic powder product having uniform properties.

In some embodiments, the gas channel is configured as an area fraction from 0.05 area fraction to not greater than 0.8 area fraction of a cross-sectional area of the reaction chamber.

In some embodiments, the preform is configured from a plurality of granules, wherein each granule is configured from the precursor mixture.

In some embodiments, the voids are configured as intra-granule porosity in the preform.

In some embodiments, the intra-granule porosity is configured as an area fraction from 0 to not greater than 0.6 area fraction of a cross-sectional area of the preform.

In some embodiments, the voids are configured as inter-granule porosity in the preform.

In some embodiments, the inter-granule porosity is configured as an area fraction from 0 to not greater than 0.6 area fraction of a cross-sectional area of the preform exclusive of the gas channel.

In some embodiments, the voids are configured as a combination of inter-granule porosity and intra-granule porosity in the preform.

In some embodiments, at least one preform is configured within a container, and wherein the container is configured to permit the sweep gas to pass therethrough.

In one aspect of the instant disclosure, a system, comprises: a reactor body having a first end and a second end, wherein the reactor body is configured with an inner sidewall extending from the first end to the second end to define a reaction chamber; wherein the reactor body is configured with a heat source to provide a hot zone along the reaction chamber; a sweep gas inlet adjacent to the first end and configured to direct a sweep gas into the reaction chamber and a sweep gas outlet adjacent to the second end and configured to direct an exhaust gas from the reaction chamber; a powder configured from a mixture of precursor materials for a carbothermic reaction, the powder configured in the reactor chamber to permit sweep gas to flow there through, such that the precursor mixture is reacted in the hot zone to form a ceramic powder product having uniform properties.

Figure 1:
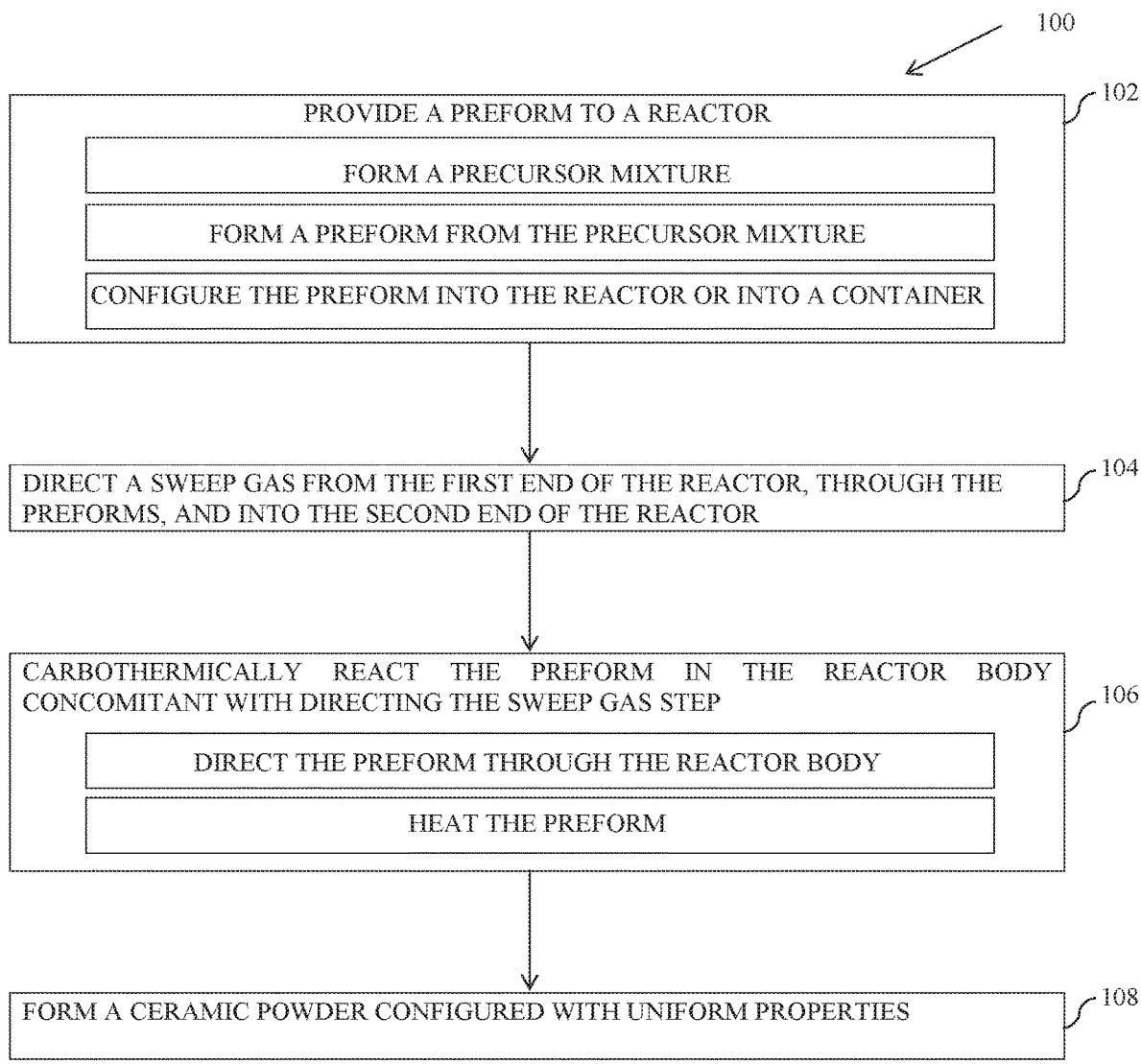
FIG. 1 depicts a flow chart for an embodiment of a method for making ceramic powder in accordance with the instant disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and defined embodiments, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

FIG. 1 depicts a flow chart for an embodiment of a method 100 for making ceramic powder in accordance with the instant disclosure. In some embodiments, the method 100 may be performed in a suitable reactor, such as the reactor described below with respect to FIG. 2 and FIG. 3. In some embodiments, the method 100 begins at 102 by providing an at least one preform to a suitable reactor. In some embodiments, providing the preform at 102 includes: (a) forming a precursor mixture, (b) forming a preform from the precursor mixture, and (c) configuring the preform into the reactor or into a container to be placed within the reactor.

In some embodiments, the precursor mixture is formed by mixing the reagents (e.g. as set out in Table 1), with optional diluents and/or binders. In some embodiments, forming the precursor mixture further comprises one of: (a) forming a wet agglomerate (i.e. a mixture of the raw material reagents and a solvent such as water) having the reagents therein or (b) dry processing the reagents with compatible materials and/or binder, including but not limited to polyvinyl alcohol or ethyl cellulose, to form an agglomerate.

Referring to Table 1 below, examples of reagents and ceramic powder products are provided for three classes of ceramic powder products: borides, carbides, and nitrides. As shown in Table 1, the reagents that are combinable to form the precursor mixture are depicted in the first 1-4 columns, with the ceramic powder product identified to the right of the arrow (where the arrow denotes a carbothermic reaction of the precursor mixture to form the specified ceramic powder product). It is noted that carbonaceous gases such as carbon monoxide (not shown) are also produced via carbothermic reduction of the precursor materials.

TABLE 1

Carbothermic Powder Synthesis Reactions

| Reactants | | | | Product |
|---|---|---|---|---|
| Aluminum Oxide | Carbon (or Graphite] | | | → Aluminum Carbide |
| Boron Oxide (or Boric Acid] | Carbon (or Graphite] | | | → Boron Carbide |
| Chromium Oxide | Carbon (or Graphite] | | | → Chromium Carbide |
| Hafnium Oxide | Carbon (or Graphite] | | | → Hafnium Carbide |
| Molybdenum Oxide | Carbon (or Graphite] | | | → Molybdenum Carbide |
| Niobium Oxide | Carbon (or Graphite] | | | → Niobium Carbide |
| Silicon Oxide | Carbon (or Graphite] | | | → Silicon Carbide |
| Tantalum Oxide | Carbon (or Graphite] | | | → Tantalum Carbide |
| Titanium Oxide | Carbon (or Graphite] | | | → Titanium Carbide |
| Vanadium Oxide | Carbon (or Graphite] | | | → Vanadium Carbide |
| Tungsten Oxide | Carbon (or Graphite] | | | → Tungsten Carbide |
| Zirconium Oxide | Carbon (or Graphite] | | | → Zirconium Carbide |
| Aluminum Oxide | Boron Oxide (or Boric Acid] | Carbon (or Graphite] | | → Aluminum Boride |
| Chromium Oxide | Boron Oxide (or Boric Acid] | Carbon (or Graphite] | | → Chromium Boride or Chromium Diboride |
| Hafnium Oxide | Boron Oxide (or Boric Acid] | Carbon (or Graphite] | | → Hafnium Diboride |
| Niobium Oxide | Boron Oxide (or Boric Acid] | Carbon (or Graphite] | | → Niobium Diboride |
| Tantalum Oxide | Boron Oxide (or Boric Acid] | Carbon (or Graphite] | | → Tantalum Diboride |
| Titanium Oxide | Boron Oxide (or Boric Acid] | Carbon (or Graphite] | | → Titanium Diboride |
| Titanium Oxide | Boron Oxide (or Boric Acid] | Carbon (or Graphite] | Ti | → Titanium Monoboride |
| Vanadium Oxide | Boron Oxide (or Boric Acid] | Carbon (or Graphite] | | → Vanadium Diboride |
| Zirconium Oxide | Boron Oxide (or Boric Acid] | Carbon (or Graphite] | | → Zirconium Diboride |
| Aluminum Oxide | Boron Oxide (or Boric Acid] | Carbon (or Graphite] | | → Aluminum Boron Carbide |
| Aluminum Oxide | Nitrogen | Carbon (or Graphite] | | → Aluminum Nitride |
| Boron Oxide (or Boric Acid] | Nitrogen | Carbon (or Graphite] | | → Boron Nitride |
| Chromium Oxide | Nitrogen | Carbon (or Graphite] | | → Chromium Nitride |
| Hafnium Oxide | Nitrogen | Carbon (or Graphite] | | → Hafnium Nitride |
| Molybdenum Oxide | Nitrogen | Carbon (or Graphite] | | → Molybdenum Nitride |
| Niobium Oxide | Nitrogen | Carbon (or Graphite] | | → Niobium Nitride |
| Silicon Oxide | Nitrogen | Carbon (or Graphite] | | → Silicon Nitride |
| Tantalum Oxide | Nitrogen | Carbon (or Graphite] | | → Tantalum Nitride |
| Titanium Oxide | Nitrogen | Carbon (or Graphite] | | → Titanium Nitride |
| Vanadium Oxide | Nitrogen | Carbon (or Graphite] | | → Vanadium Nitride |
| Tungsten Oxide | Nitrogen | Carbon (or Graphite] | | → Tungsten Nitride |
| Zirconium Oxide | Nitrogen | Carbon (or Graphite] | | → Zirconium Nitride |
| Aluminum Oxide | Nitrogen | Carbon (or Graphite] | | → Aluminum Oxy-Nitride |
| Aluminum Oxide | Silicon Oxide | Carbon (or Graphite] | Nitrogen | → Silicon Aluminum Oxy-Nitride |

In some embodiments, the amount of the titanium dioxide is 20 weight percent (wt. %) to 50 wt. % based on a total weight of the precursor mixture. In some embodiments, the amount of the titanium dioxide is 25 wt. % to 50 wt. % based on a total weight of the precursor mixture. In some embodiments, the amount of the titanium dioxide is 30 wt. % to 50 wt. % based on a total weight of the precursor mixture. In some embodiments, the amount of the titanium dioxide is 35 wt. % to 50 wt. % based on a total weight of the precursor mixture. In some embodiments, the amount of the titanium dioxide is 40 wt. % to 50 wt. % based on a total weight of the precursor mixture. In some embodiments, the amount of the titanium dioxide is 45 wt. % to 50 wt. % based on a total weight of the precursor mixture.

In some embodiments, the amount of the titanium dioxide is 20 wt. % to 45 wt. % based on a total weight of the precursor mixture. In some embodiments, the amount of the titanium dioxide is 20 wt. % to 40 wt. % based on a total weight of the precursor mixture. In some embodiments, the amount of the titanium dioxide is 20 wt. % to 35 wt. % based on a total weight of the precursor mixture. In some embodiments, the amount of the titanium dioxide is 20 wt. % to 30 wt. % based on a total weight of the precursor mixture. In some embodiments, the amount of the titanium dioxide is 20 wt. % to 25 wt. % based on a total weight of the precursor mixture.

In some embodiments, the amount of the titanium dioxide is 25 wt. % to 45 wt. % based on a total weight of the precursor mixture. In some embodiments, the amount of the titanium dioxide is 30 wt. % to 40 wt. % based on a total weight of the precursor mixture.

In some embodiments, the amount of the carbon source is 10 wt. % to 35 wt. % based on a total weight of the precursor mixture. In some embodiments, the amount of the carbon source is 15 wt. % to 35 wt. % based on a total weight of the precursor mixture. In some embodiments, the amount of the carbon source is 20 wt. % to 35 wt. % based on a total weight of the precursor mixture. In some embodiments, the amount of the carbon source is 25 wt. % to 35 wt. % based on a total weight of the precursor mixture. In some embodiments, the amount of the carbon source is 30 wt. % to 35 wt. % based on a total weight of the precursor mixture.

In some embodiments, the amount of the carbon source is 10 wt. % to 30 wt .% based on a total weight of the precursor mixture. In some embodiments, the amount of the carbon source is 10 wt. % to 25 wt. % based on a total weight of the precursor mixture. In some embodiments, the amount of the carbon source is 10 wt. % to 20 wt. % based on a total weight of the precursor mixture. In some embodiments, the amount of the carbon source is 10 wt. % to 15 wt. % based on a total weight of the precursor mixture.

In some embodiments, the amount of the carbon source is 15 wt. % to 30 wt. % based on a total weight of the precursor mixture. In some embodiments, the amount of the carbon source is 15 wt. % to 25 wt. % based on a total weight of the precursor mixture. In some embodiments, the amount of the carbon source is 20 wt. % to 25 wt. % based on a total weight of the precursor mixture.

In some embodiments, the amount of boric acid is 30 wt. % to 70 wt. % based on a total weight of the precursor mixture. In some embodiments, the amount of boric acid is 30 wt. % to 65 wt. % based on a total weight of the precursor mixture. In some embodiments, the amount of boric acid is 30 wt. % to 60 wt. % based on a total weight of the precursor mixture. In some embodiments, the amount of boric acid is 30 wt. % to 55 wt. % based on a total weight of the precursor mixture. In some embodiments, the amount of boric acid is 30 wt. % to 50 wt. % based on a total weight of the precursor mixture. In some embodiments, the amount of boric acid is 30 wt. % to 45 wt. % based on a total weight of the precursor mixture. In some embodiments, the amount of boric acid is 30 wt. % to 40 wt. % based on a total weight of the precursor mixture. In some embodiments, the amount of boric acid is 30 wt. % to 35 wt. % based on a total weight of the precursor mixture.

In some embodiments, the amount of boric acid is 35 wt. % to 70 wt. % based on a total weight of the precursor mixture. In some embodiments, the amount of boric acid is 40 wt. % to 70 wt. % based on a total weight of the precursor mixture. In some embodiments, the amount of boric acid is 45 wt. % to 70 wt. % based on a total weight of the precursor mixture. In some embodiments, the amount of boric acid is 50 wt. % to 70 wt. % based on a total weight of the precursor mixture. In some embodiments, the amount of boric acid is 55 wt. % to 70 wt. % based on a total weight of the precursor mixture. In some embodiments, the amount of boric acid is 60 wt. % to 70 wt. % based on a total weight of the precursor mixture. In some embodiments, the amount of boric acid is 65 wt. % to 70 wt. % based on a total weight of the precursor mixture.

In some embodiments, the amount of boric acid is 35 wt. % to 65 wt. % based on a total weight of the precursor mixture. In some embodiments, the amount of boric acid is 40 wt. % to 60 wt. % based on a total weight of the precursor mixture. In some embodiments, the amount of boric acid is 45 wt. % to 55 wt. % based on a total weight of the precursor mixture.

In some embodiments, the precursor mixture is formed into a preform. As used herein, "preform" means a shaped mixture of precursor materials configured to enable/permit gas to flow through the preform.

In one non-limiting example, forming of the precursor mixture into at least one preform includes adding the pliable, hydrated precursor mixture into a mold, compacting the mixture in the mold (e.g. in the target shape of the preform), followed by dehydrating the mixture at elevated temperatures (e.g. at sufficient temperature and time to (1) drive off water from the precursor mixture and (2) configure the preform in a hardened, stable shape).

In one non-limiting example, forming of the precursor mixture into at least one preform includes casting (pouring and/or directing) the flowable, hydrated precursor mixture into a mold, and processing the precursor mixture into the preform by (1) removing excess water from the precursor mixture to configure the preform from the as-cast shape.

In one non-limiting example, forming of the precursor mixture into at least one preform includes directing the pliable, hydrated precursor mixture into an extrusion press, and extruding the precursor mixture through an extrusion die in order to form an extrudate, followed by processing the extrudate to remove any excess water and provide a preform from the extruded precursor mixture.

In some embodiments, the preform is removed from the mold or cast support prior to being directed into the reactor body.

In some embodiments, the compacting step is conducted with a compaction tool. In some embodiments, the dehydration step is conducted using air (or other gas) or heat (e.g. a furnace).

In some embodiments the preform is configured with (a) at least one gas channel and (b) macro-porosity in at least a portion of the preform body (e.g. where macro-porosity refers to sufficiently sized voids to permit gas to permeate through the preform).

In some embodiments, the preform is configured to take up 0.2 to 0.95 area fraction when viewing a cross-sectional area across the reaction chamber. In some embodiments, the preform is configured to take up: 0.5 to 0.95 area fraction; 0.55 to 0.95 area fraction; 0.6 to 0.95 area fraction; 0.65 to 0.95 area fraction; 0.7 to 0.95 area fraction; 0.75 to 0.95 area fraction; 0.8 to 0.95 area fraction; 0.85 to 0.95 area fraction; or 0.9 to 0.95 area fraction, when viewing a cross-sectional area across the reaction chamber.

In some embodiments, the preform is configured to take up: 0.2 to 0.90 area fraction; 0.2 to 0.85 area fraction; 0.2 to 0.80 area fraction; 0.2 to 0.75 area fraction; 0.2 to 0.70 area fraction; 0.2 to 0.65 area fraction; 0.2 to 0.60 area fraction; 0.2 to 0.55 area fraction; 0.2 to 0.50 area fraction; or 0.2 to 0.40 area fraction, when viewing a cross-sectional area across the reaction chamber.

In some embodiments, the preform is configured to take up 0.2 area fraction to not greater than 0.95 area fraction of a cross-sectional area taken across the reaction chamber. In some embodiments, the preform is configured to take up 0.6 area fraction to not greater than 0.95 area fraction of a cross-sectional area taken across the reaction chamber. In some embodiments, the preform is configured to take up 0.75 area fraction to not greater than 0.95 area fraction of a cross-sectional area taken across the reaction chamber.

In some embodiments, the preform is configured from a plurality of granules. In some embodiments, the preform is configured with inter-granule porosity, which is measured between granules of a single preform.

In some embodiments, the inter-granule porosity is configured to take up 0 to 0.6 area fraction when viewing a cross-sectional area across the preform exclusive of gas channels. In some embodiments, the inter-granule porosity is configured to take up: 0.1 to 0.6 area fraction; 0.2 to 0.6 area fraction; 0.3 area to 0.6 fraction; 0.4 to 0.6 area fraction; or 0.5 to 0.6 area fraction, when viewing a cross-sectional area across the preform, exclusive of gas channels.

In some embodiments, the inter-granule porosity is configured to take up: 0 to 0.5 area fraction; 0 to 0.4 area fraction; 0 to 0.3 area fraction; 0 to 0.2 area fraction; 0 to 0.1 area fraction, when viewing a cross-sectional area across the preform, exclusive of gas channels.

In some embodiments, the inter-granule porosity is configured to take up 0 area fraction to not greater than 0.6 area fraction of a cross-sectional area taken across the preform, exclusive of gas channels. In some embodiments, the preform is configured to take up 0.2 area fraction to not greater than 0.6 area fraction of a cross-sectional area taken across the preform, exclusive of gas channels. In some embodiments, the preform is configured to take up 0.3 area fraction to not greater than 0.6 area fraction of a cross-sectional area taken across the preform, exclusive of gas channels.

In some embodiments, the preform is configured with intra-granule porosity, which is measured within a single granule (e.g. porosity between precursor mixture/reagents).

In some embodiments, there is inter-granule porosity and no intra-granular porosity (0 area fraction). In some embodiments, there is intra-granule porosity and no inter-granule porosity.

In some embodiments, the intra-granule porosity is configured to take up not greater than 0 area fraction; not greater than 0.05 area fraction; not greater than 0.1 area fraction; not greater than 0.2 area fraction; not greater than 0.3 area fraction; not greater than 0.4 area fraction; not greater than 0.5 area fraction; or not greater than 0.6 area fraction, when viewing a cross-sectional area across the preform.

In some embodiments, the intra-granule porosity is configured to take up 0 area fraction to not greater than 0.6 area fraction of a cross-sectional area taken across the preform. In some embodiments, the intra-granule porosity is configured to take up 0 area fraction to not greater than 0.5 area fraction of a cross-sectional area taken across the preform.

In some embodiments, the intra-granule porosity is configured to take up 0 area fraction to not greater than 0.4 area fraction of a cross-sectional area taken across the preform. In some embodiments, the intra-granule porosity is configured to take up 0 area fraction to not greater than 0.3 area fraction of a cross-sectional area taken across the preform.

In some embodiments, the preform is configured with at least one gas channel.

As used herein, "gas channel" refers to the open space/volume that is not taken up by the preform (and/or the container, if a container is utilized), in the cross-sectional area of the reaction chamber. In some embodiments, the gas channel is configured in a direction parallel to the gas flow through the preform body.

In some embodiments, the gas channel is configured to take up 0.05 to 0.8 area fraction when viewing a cross-sectional area across the reaction chamber. In some embodiments, the gas channel is configured to take up: 0.1 to 0.8 area fraction; 0.1 to 0.7 area fraction; 0.1 to 0.6 area fraction; 0.1 to 0.5 area fraction; 0.1 to 0.4 area fraction; 0.1 to 0.3 area fraction; or 0.1 to 0.2 area fraction, when viewing a cross-sectional area across the reaction chamber.

In some embodiments, the gas channel is configured to take up: 0.1 to 0.8 area fraction; 0.2 to 0.8 area fraction; 0.3 to 0.8 area fraction; 0.4 to 0.8 area fraction; 0.5 to 0.8 area fraction; 0.6 to 0.8 area fraction; or 0.7 to 0.8 area fraction, when viewing a cross-sectional area across the reaction chamber.

In some embodiments, the gas channel is configured to take up from at least 0.05 area fraction to not greater than 0.8 area fraction, of a cross-sectional area taken across the reaction chamber. In some embodiments, the gas channel is configured to take up at least 0.1 area fraction to not greater than 0.8 area fraction, of a cross-sectional area taken across the reaction chamber. In some embodiments, the gas channel is configured to take up from at least 0.2 area fraction to not greater than 0.8 area fraction, of a cross-sectional area taken across the reaction chamber. In some embodiments, the gas channel is configured to take up from at least 0.3 area fraction to not greater than 0.8 area fraction, of a cross-sectional area taken across the reaction chamber.

In some embodiments, when the preform is sized such that one or more preforms fit into a container, one or more gas channels are configured from the container (e.g. a mesh wall defining a vertical gas channel within the plurality of preforms, see, e.g. FIG. 5H).

In some embodiments, the diameter of the preform is 2 inches to 48 inches. In some embodiments, the diameter of the preform is 2 inches to 42 inches. In some embodiments, the diameter of the preform is 2 inches to 36 inches. In some embodiments, the diameter of the preform is 2 inches to 30 inches. In some embodiments, the diameter of the preform is 2 inches to 24 inches. In some embodiments, the diameter of the preform is 2 inches to 18 inches. In some embodiments, the diameter of the preform is 2 inches to 12 inches. In some embodiments, the diameter of the preform is 2 inches to 10 inches. In some embodiments, the diameter of the preform is 2 inches to 8 inches. In some embodiments, the diameter of the preform is 2 inches to 6 inches. In some embodiments, the diameter of the preform is 2 inches to 4 inches.

In some embodiments, the diameter of the preform is 4 inches to 48 inches. In some embodiments, the diameter of the preform is 6 inches to 48 inches. In some embodiments, the diameter of the preform is 8 inches to 48 inches. In some embodiments, the diameter of the preform is 10 inches to 48 inches. In some embodiments, the diameter of the preform is 12 inches to 48 inches. In some embodiments, the diameter of the preform is 18 inches to 48 inches. In some embodiments, the diameter of the preform is 24 inches to 48 inches. In some embodiments, the diameter of the preform is 30 inches to 48 inches. In some embodiments, the diameter of the preform is 36 inches to 48 inches. In some embodiments, the diameter of the preform is 42 inches to 48 inches.

In some embodiments, the diameter of the preform is 4 inches to 6 inches. In some embodiments, the diameter of the preform is 4 inches to 8 inches. In some embodiments, the diameter of the preform is 4 inches to 10 inches. In some embodiments, the diameter of the preform is 6 inches to 12 inches. In some embodiments, the diameter of the preform is 12 inches to 24 inches. In some embodiments, the diameter of the preform is 24 inches to 36 inches. In some embodiments, the diameter of the preform is 36 inches to 48 inches.

In some embodiments, the "diameter of the at least one opening" means either the diameter of each opening or the sum of the diameters of all the openings in the preform. In some embodiments, the diameter of the at least one opening is 0 inches to 46 inches. In some embodiments, the diameter of the at least one opening is ¼ inch to 46 inches. In some embodiments, the diameter of the at least one opening is 2 inches to 46 inches. In some embodiments, the diameter of the at least one opening is 3 inches to 46 inches. In some embodiments, the diameter of the at least one opening is 4 inches to 46 inches. In some embodiments, the diameter of the at least one opening is 5 inches to 46 inches. In some embodiments, the diameter of the at least one opening is 8 inches to 46 inches. In some embodiments, the diameter of the at least one opening is 12 inches to 46 inches. In some embodiments, the diameter of the at least one opening is 16 inches to 46 inches. In some embodiments, the diameter of the at least one opening is 20 inches to 46 inches. In some embodiments, the diameter of the at least one opening is 24 inches to 46 inches. In some embodiments, the diameter of the at least one opening is 28 inches to 46 inches. In some embodiments, the diameter of the at least one opening is 32 inches to 46 inches. In some embodiments, the diameter of the at least one opening is 36 inches to 46 inches. In some embodiments, the diameter of the at least one opening is 40 inches to 46 inches.

In some embodiments, the diameter of the at least one opening is 0 inches to 42 inches. In some embodiments, the diameter of the at least one opening is 0 inches to 36 inches. In some embodiments, the diameter of the at least one opening is 0 inches to 32 inches. In some embodiments, the diameter of the at least one opening is 0 inches to 28 inches. In some embodiments, the diameter of the at least one opening is 0 inches to 24 inches. In some embodiments, the diameter of the at least one opening is 0 inches to 20 inches. In some embodiments, the diameter of the at least one opening is 0 inches to 16 inches. In some embodiments, the diameter of the at least one opening is 0 inches to 12 inches. In some embodiments, the diameter of the at least one opening is 0 inches to 10 inches. In some embodiments, the diameter of the at least one opening is 0 inches to 8 inches. In some embodiments, the diameter of the at least one opening is 0 inches to 6 inches. In some embodiments, the diameter of the at least one opening is 0 inches to 4 inches.

In some embodiments, the diameter of the at least one opening is 1 inches to 3 inches. In some embodiments, the diameter of the at least one opening is 3 inches to 8 inches. In some embodiments, the diameter of the at least one opening is 6 inches to 24 inches. In some embodiments, the diameter of the at least one opening is 10 inches to 30 inches. In some embodiments, the diameter of the at least one opening is 12 inches to 36 inches.

In some embodiments, the diameter of the at least one opening is based, at least in part, on achieving substantially uniform heating throughout the preform (i.e. throughout the volume of the preform).

In some embodiments, the height of the preform is 2 inches to 48 inches. In some embodiments, the height of the preform is 4 inches to 48 inches. In some embodiments, the height of the preform is 6 inches to 48 inches. In some embodiments, the height of the preform is 8 inches to 48 inches. In some embodiments, the height of the preform is 12 inches to 48 inches. In some embodiments, the height of the preform is 16 inches to 48 inches. In some embodiments, the height of the preform is 20 inches to 48 inches. In some embodiments, the height of the preform is 24 inches to 48 inches. In some embodiments, the height of the preform is 28 inches to 48 inches. In some embodiments, the height of the preform is 32 inches to 48 inches. In some embodiments, the height of the preform is 36 inches to 48 inches. In some embodiments, the height of the preform is 40 inches to 48 inches. In some embodiments, the height of the preform is 44 inches to 48 inches.

In some embodiments, the height of the preform is 2 inches to 44 inches. In some embodiments, the height of the preform is 2 inches to 40 inches. In some embodiments, the height of the preform is 2 inches to 36 inches. In some embodiments, the height of the preform is 2 inches to 32 inches. In some embodiments, the height of the preform is 2 inches to 28 inches. In some embodiments, the height of the preform is 2 inches to 24 inches. In some embodiments, the height of the preform is 2 inches to 20 inches. In some embodiments, the height of the preform is 2 inches to 16 inches. In some embodiments, the height of the preform is 2 inches to 12 inches. In some embodiments, the height of the preform is 2 inches to 8 inches. In some embodiments, the height of the preform is 2 inches to 6 inches. In some embodiments, the height of the preform is 2 inches to 4 inches.

In some embodiments, the height of the preform is 4 inches to 8 inches. In some embodiments, the height of the preform is 8 inches to 16 inches. In some embodiments, the height of the preform is 12 inches to 24 inches. In some embodiments, the height of the preform is 8 inches to 42 inches. In some embodiments, the height of the preform is 4 inches to 8 inches. In some embodiments, the height of the preform is 16 inches to 28 inches. In some embodiments, the height of the preform is 6 inches to 24 inches.

Next, at 104, the method 100 comprises directing a sweep gas from a first end of the reactor, through the at least one preform, and into the second end of the reactor.

In some embodiments, when the ceramic powder is a carbide, the sweep gas is selected from the group of: argon or any other noble gas, carbon monoxide, carbon dioxide, and/or combinations thereof.

In some embodiments, when the ceramic powder is a nitride, the sweep gas is nitrogen or combinations of nitrogen and noble gas. In some embodiments, when the ceramic powder is a boride, the sweep gas is argon or any other noble gas.

In some embodiments, the flow rate of the sweep gas is sufficient to remove or reduce the concentration of the reaction byproducts in the reactor and/or sufficient to manage atmospheric chemistry in the reactor. In some embodiments, the sweep gas flow rate is based, at least in part, on the reactor geometry, the desired ceramic powder, the temperature profile within the reactor and/or other process conditions related to the powder production.

In some embodiments, the sufficient time is dependent on type of reagents and powder and the sufficient temperature. In some embodiments, the sufficient time is 0.5 hour to 12 hours. In some embodiments, the sufficient time is 0.5 hour to 11 hours. In some embodiments, the sufficient time is 0.5 hour to 10 hours. In some embodiments, the sufficient time is 0.5 hour to 9 hours. In some embodiments, the sufficient time is 0.5 hour to 8 hours. In some embodiments, the sufficient time is 0.5 hour to 7 hours. In some embodiments, the sufficient time is 0.5 hour to 6 hours. In some embodiments, the sufficient time is 0.5 hour to 5 hours. In some embodiments, the sufficient time is 0.5 hour to 4 hours. In some embodiments, the sufficient time is 0.5 hour to 3 hours. In some embodiments, the sufficient time is 0.5 hour to 2 hours. In some embodiments, the sufficient time is 0.5 hour to 1 hours.

In some embodiments, the sufficient time is 1 hour to 12 hours. In some embodiments, the sufficient time is 2 hours to 12 hours. In some embodiments, the sufficient time is 3 hours to 12 hours. In some embodiments, the sufficient time is 4 hours to 12 hours. In some embodiments, the sufficient time is 5 hours to 12 hours. In some embodiments, the sufficient time is 6 hours to 12 hours. In some embodiments, the sufficient time is 7 hours to 12 hours. In some embodiments, the sufficient time is 8 hours to 12 hours. In some embodiments, the sufficient time is 9 hours to 12 hours. In some embodiments, the sufficient time is 10 hours to 12 hours. In some embodiments, the sufficient time is 11 hours to 12 hours.

In some embodiments, the sufficient time is 1 hour to 8 hours. In some embodiments, the sufficient time is 1 hour to 6 hours. In some embodiments, the sufficient time is 1 hour to 4 hours. In some embodiments, the sufficient time is 1 hour to 2 hours. In some embodiments, the sufficient time is 2 hour to 11 hours. In some embodiments, the sufficient time is 3 hour to 10 hours. In some embodiments, the sufficient time is 4 hour to 9 hours. In some embodiments, the sufficient time is 5 hour to 8 hours. In some embodiments, the sufficient time is 6 hour to 7 hours.

In some embodiments, the powder is titanium diboride and the sufficient time is 1 hour to 6 hours. In some embodiments, the powder is titanium diboride and the sufficient time is 1 hour to 5 hours. In some embodiments, the powder is titanium diboride and the sufficient time is 1 hour to 4 hours. In some embodiments, the powder is titanium diboride and the sufficient time is 1 hour to 3 hours. In some embodiments, the powder is titanium diboride and the sufficient time is 1 hour to 2 hours. In some embodiments, the powder is titanium diboride and the sufficient time is 2 hour to 6 hours. In some embodiments, the powder is titanium diboride and the sufficient time is 3 hour to 6 hours. In some embodiments, the powder is titanium diboride and the sufficient time is 4 hour to 6 hours. In some embodiments, the powder is titanium diboride and the sufficient time is 5 hour to 6 hours.

In some embodiments, the sufficient temperature and sufficient time are combinations of the temperatures and times detailed above.

Next, at 106, the method 100 comprises carbothermically reacting the at least one preform within the reactor body, concomitant with directing the sweep gas. In some embodiments, carbothermically reacting the at least one preform within the reactor body, concomitant with directing the sweep gas comprises: directing the at least one preform (e.g. housed/retained in a container) through the reactor body, and heating the at least one preform (comprising a precursor mixture) to a sufficient temperature for a sufficient time to form a ceramic powder product via carbothermic reaction of the reagents in the precursor mixture. Non-limiting examples of carbothermic reactions forming ceramic powders are shown in Table 1

As used herein, the term "carbothermic reaction" means a reaction that includes the reduction of substances using carbon as the reducing agent at elevated temperatures typically ranging from about 500 to about 2,500 degrees Celsius. In some embodiments, the sufficient temperature (to carbothermically react the precursor mixture) is dependent on the type of reagents and powder utilized to form the precursor mixture.

Next, at 108, the method 100 comprises forming a ceramic powder product configured with uniform and/or consistent properties. In some embodiments, the method 100 continuously produces the ceramic powder products in the heated reactor, including as non-limiting examples: borides, nitrides, and/or carbides. In some embodiments, the ceramic powder is any powder described herein. In some embodiments, the ceramic powder product includes, but is not limited to, titanium diboride, boron carbide, boron nitride, aluminum nitride, silicon aluminum nitride, zirconium diboride, aluminum nitride, silicon aluminum oxy-nitride, titanium carbide, silicon carbide, titanium nitride, and aluminum carbide.

As used herein, "consistent properties" means: that preforms that are directed through the carbothermic reactor (e.g. at different times and/or in different containers) exhibit properties including but not limited to particle size distribution, surface area, chemical composition, and particle shape, that are measurably indistinguishable and/or compatible with the specification for the final ceramic powder product (e.g. where properties are analytically determined and/or evaluated).

As used herein, "uniform properties" means: that the properties (e.g. qualitatively measured and/or quantitatively measured) are generally unchanging and/or invariable in form or character (e.g. in comparing ceramic powder product recovered from one preform to ceramic powder product recovered from another preform).

In some embodiments, the method further comprises removing the ceramic powder product from the reactor. In some embodiments, the ceramic powder product is removed from the reactor in a receiving unit having an inert atmosphere so as to maintain an inert environment in the vertical reactor.

Figure 2:
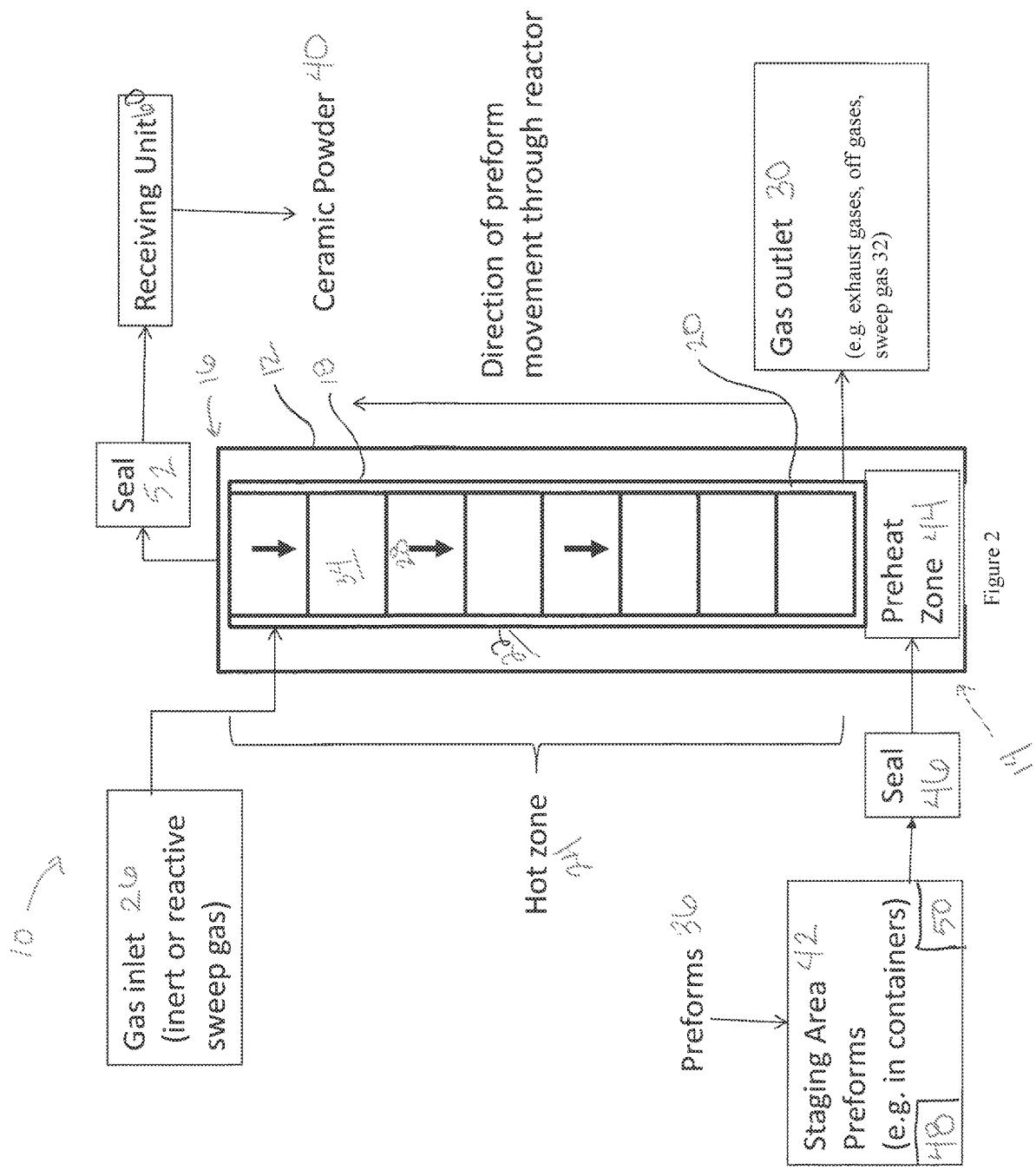
FIG. 2 depicts an embodiment of the system (reactor) in accordance with some embodiments of the instant disclosure.
Figure 3:
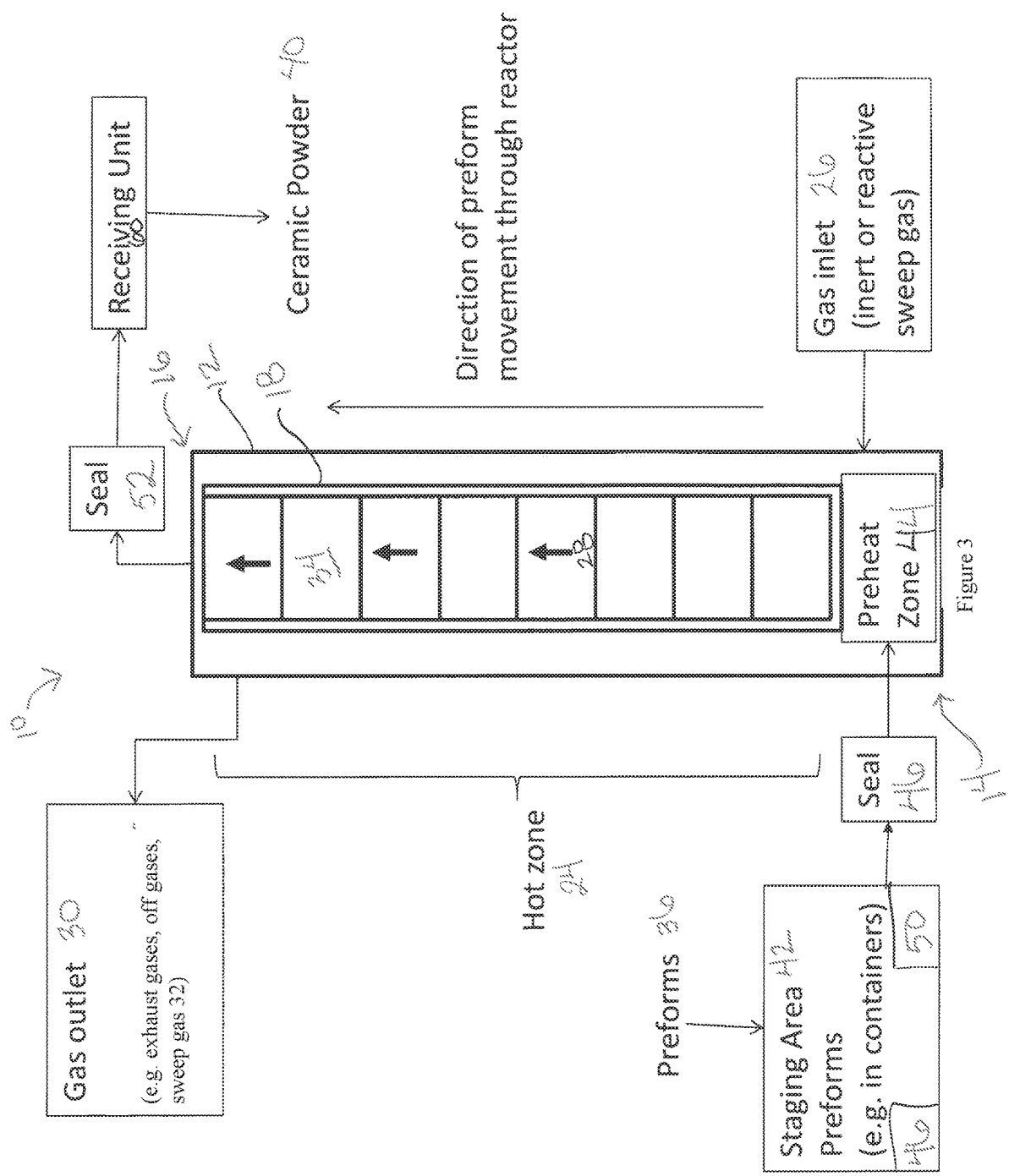
FIG. 3 depicts another embodiment of the system (reactor) in accordance with some embodiments of the instant disclosure.

FIG. 2 depicts an embodiment of the system (reactor) in accordance with the instant disclosure. Referring to FIG. 2, a system 10 is depicted, including a reactor body 12 configured with a staging area 42, a receiving unit 60, gas sweep 28 (gas inlet 26 and gas outlet 30) and a sealed configuration across the reactor body (e.g. seal 46 and seal 52). In some embodiments, the reactor body 12 is vertical, horizontal, or any angle between 0 and 90 degrees. In some embodiments as shown in FIG. 2 and FIG. 3, the reactor body 12 is vertical. In some embodiments, the reactor body is coupled to a heat source 22 to provide a hot zone 24 along the reaction chamber.

In some embodiments, a cross-section of the reactor body is in a circle, square, rectangular, pentagon, hexagon, or any other suitable shape. In some embodiments, the reactor is graphite, silicon carbide, boron nitride, alumina, molybdenum, tungsten, or other refractory materials that are compatible with the reagents and/or byproducts.

As shown in FIGS. 2 and 3, preforms 36 (e.g. retained in at least one container 34) are directed into the staging area 42. The staging area 42 is enclosed/sealed and equipped with a valve 48. Valve 48 is configured for inserting a positive pressure (e.g. gas purge of staging area 42 and preforms 36). Valve 48 is also configured to insert a negative pressure (e.g. pull a vacuum through the staging area 42 and or preforms 36). Staging area 42 is also equipped with a heat source 50, such that the preforms 36 and container(s) 34 can be preheated prior to entering the reactor body.

After the preform 36 travels through the staging area 42, the preform 36 crosses the seal 46 adjacent to the first end 14 of the reactor body and is introduced into the reaction chamber 20. The preform 36 and/or container 34 is sufficiently sized such that it is retained in close proximity with the inner sidewall 18 of the reactor 12 such that the outer diameter of the container 34 is less than the diameter of the inner sidewall 18. The preform 36 (e.g. and container) is heated in the preheat zone 44, after which the preform 36 is directed into the hot zone 24 of the reaction chamber 20. In the hot zone 24, the temperature is sufficient to promote carbothermic reaction of the precursor material 38, provided the preforms 36 are retained in the hot zone 24 for a sufficient time.

Within the reaction chamber 20, the containers 34 containing at least one preform 36 are aligned with each other such that the containers are sequentially configured throughout the reaction chamber. The ends of containers 34 are coincidental to one another such that the containers 34 are arranged in a position relative to one another such that each individual container is a component 70 of a sequentially configured container assembly in the reaction chamber 20. Thus, as depicted in FIGS. 2 and 3, the preform (e.g. and container) are directed through the system 10 (e.g. from the staging area 42 to the hot zone 24 of the reaction chamber 20 and finally to the receiving unit 60) in a metered and/or indexed fashion. In some embodiments, the system is configured such that each preform is exposed to an identical reaction profile (e.g. gas flow rate, thermal profile in the reaction chamber) such that the ceramic powder product is configured with uniform and/or consistent properties.

As depicted in FIG. 2, the direction of the sweep gas 28 is counter current to the direction of movement of the preforms 36 in the reaction chamber 20. As depicted in FIG. 3, the direction of the sweep gas 28 is co-current to the direction of movement of the preforms 36 in the reaction chamber 20.

As the preforms reach the end of the reaction chamber 20, the preforms 36 are directed through a seal 52 (configured adjacent to the second end 16) and directed out of the reactor to the receiving unit 60. As the preforms 36 are adjacent to the second end 16 and/or seal 52, the carbothermic reaction of precursor materials is complete, yielding the ceramic powder product 40. In some embodiments, the ceramic powder product 40 is generally retained in the preform 36, such that once received in the receiving unit 60, a deagglomeration step or breaking up of the preform 36 shape may be utilized to yield a ceramic powder product 40 (e.g. deagglomerated powder).

In some embodiments, the reactor includes a lid configured to direct process gas flow into or out of the reactor. In some embodiments, the lid is configured with a plurality of openings to allow for control of the gas flow rate into and out of the reactor.

In some embodiments, the inner diameter and the height (or length) of the reactor body are selected based on the diameter, thickness and number of preforms to be positioned in the reactor. In some embodiments, the inner diameter of the reactor is sufficiently greater than the diameter of the preform so as to allow flow of the inert gas between the reactor and the preform and/or to reduce or eliminate contact of the preform with a sidewall of the reactor. In some embodiments, the reactor includes a sufficient number of preforms (e.g. configured in containers) to fill the reactor based on the height (or length if horizontal) of the reactor. In some embodiments, the number of preforms in the reactors is the height (or length if horizontal) of the reactor divided by the height of the preform.

In some embodiments, the preforms are stacked in, added to and/or removed from the reactor at a controlled rate by any suitable mechanical devices, configurations, components, and/or related means. In some embodiments, the controlled rate of stacking, adding and removing the preforms is based, at least in part, on the reaction rate of the reagents in the preform. In some embodiments, the unreacted preforms and the reacted preforms are added to and removed from the reactor through a seal (e.g. configured with a sweep gas) so that the process atmosphere is maintained within the reactor.

Figure 4:
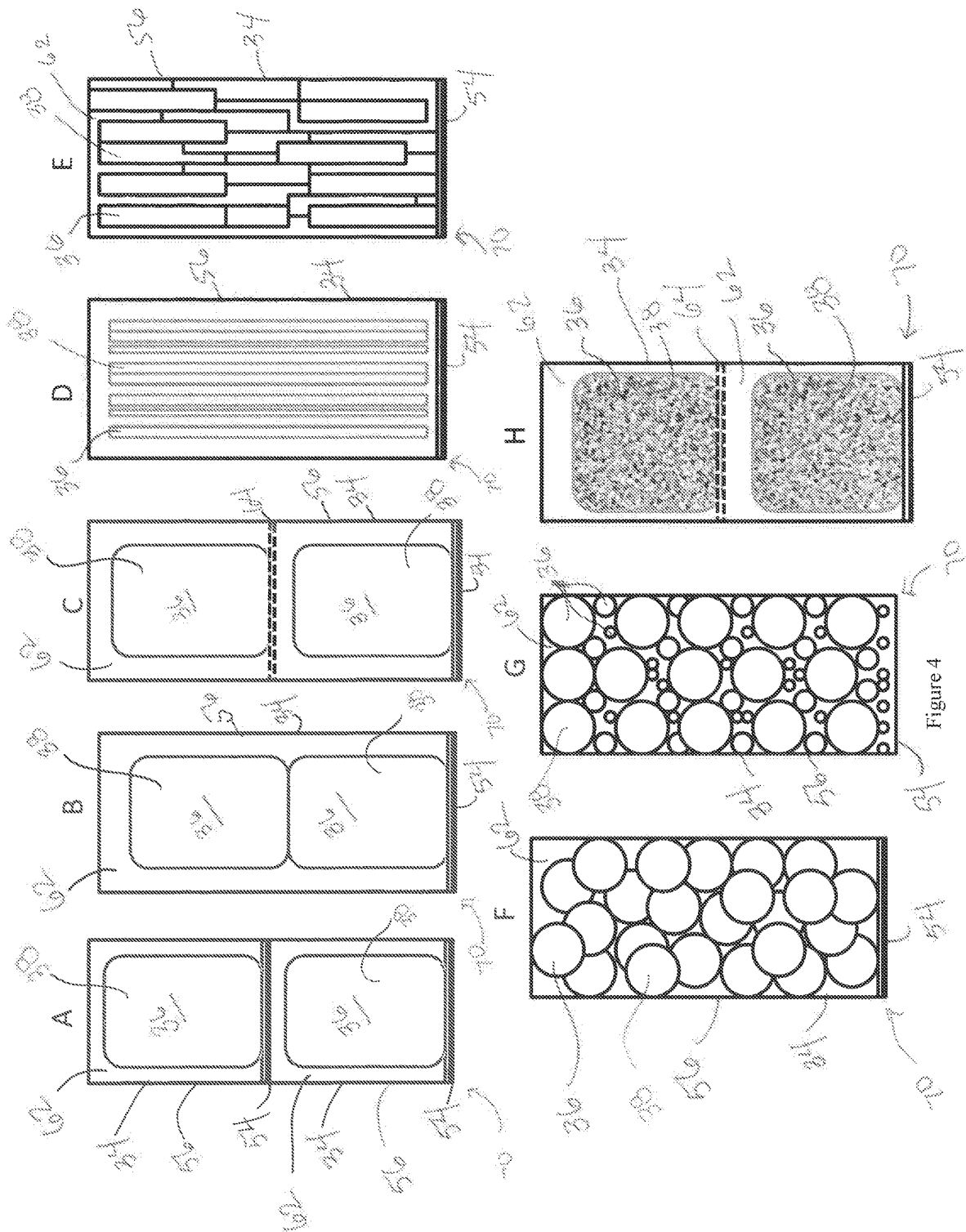
FIG. 4 depicts cut-away side views of several alternative embodiments of preform configurations within a container in accordance with some embodiments of the instant disclosure.
Figure 5:
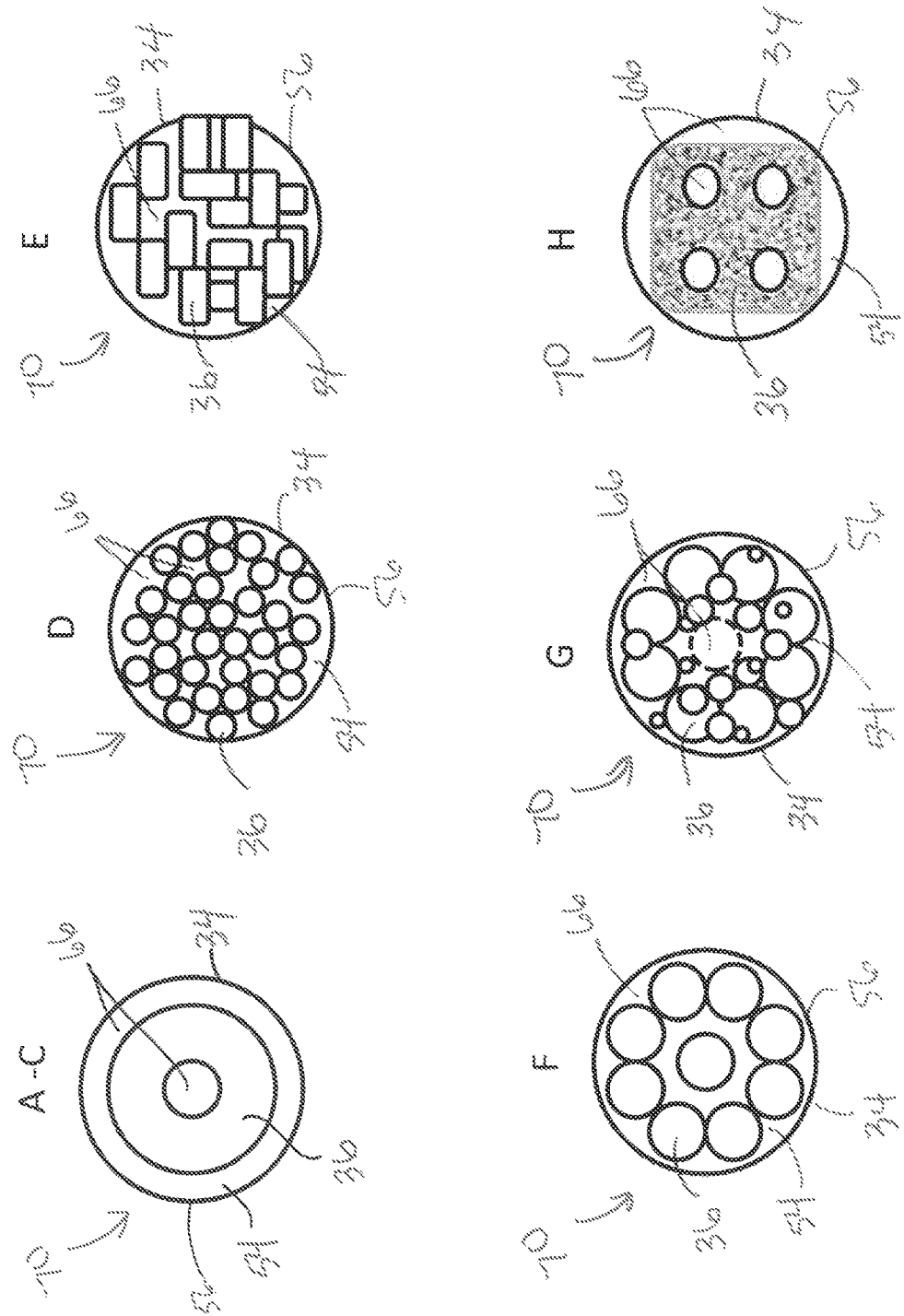
FIG. 5 depicts the top view of the views depicted in FIG. 4 in accordance with some embodiments of the instant disclosure.

FIG. 4 depicts cut-away side views of several alternative embodiments of preform configurations within a container in accordance with the instant disclosure. FIG. 5 depicts the top view of the views depicted in FIG. 4.

More specifically referring to FIGS. 4 and 5, A depicts a container configured to retain a single preform (showing two containers each configured with an end and a single preform retained therein, where the two containers are configured in a vertically stacked configuration); B depicts multiple preforms stacked vertically within one container with no spacer or plate between the two preforms (one end at the lower region of the container); C depicts preforms stacked on top of each other within a single container, where the container was configured with a spacer in the form of a plenum/perforated plate (e.g. configured to permit gases and/or heat to communicate through the container vapor space and/or out the ends); where in contrast to A-C, D depicts a different configuration of the same preform shape within a container, D-H depict different forms/shapes of preforms.

More specifically, D depicts a plurality of rods retained in a generally parallel configuration with sufficient vapor space in the container to promote communication of off gases from the rods and through the container end); E depicts a plurality of vertically and generally parallel stacked forms (e.g. brick preforms) in the container; F depicts a plurality of sphere preforms retained in the container; G depicts heterogeneously sized preforms in the container (spheres having different sized diameters: small, medium, and large); while H depicts a plurality of preforms that are each a compacted solid material.

In some embodiments, the preforms shown in FIGS. 5C and 5H can be formed via extrusion to produce preforms having continuous straight gas channels in the vertical direction and uniform geometry in the x-y plane.

Figure 6:
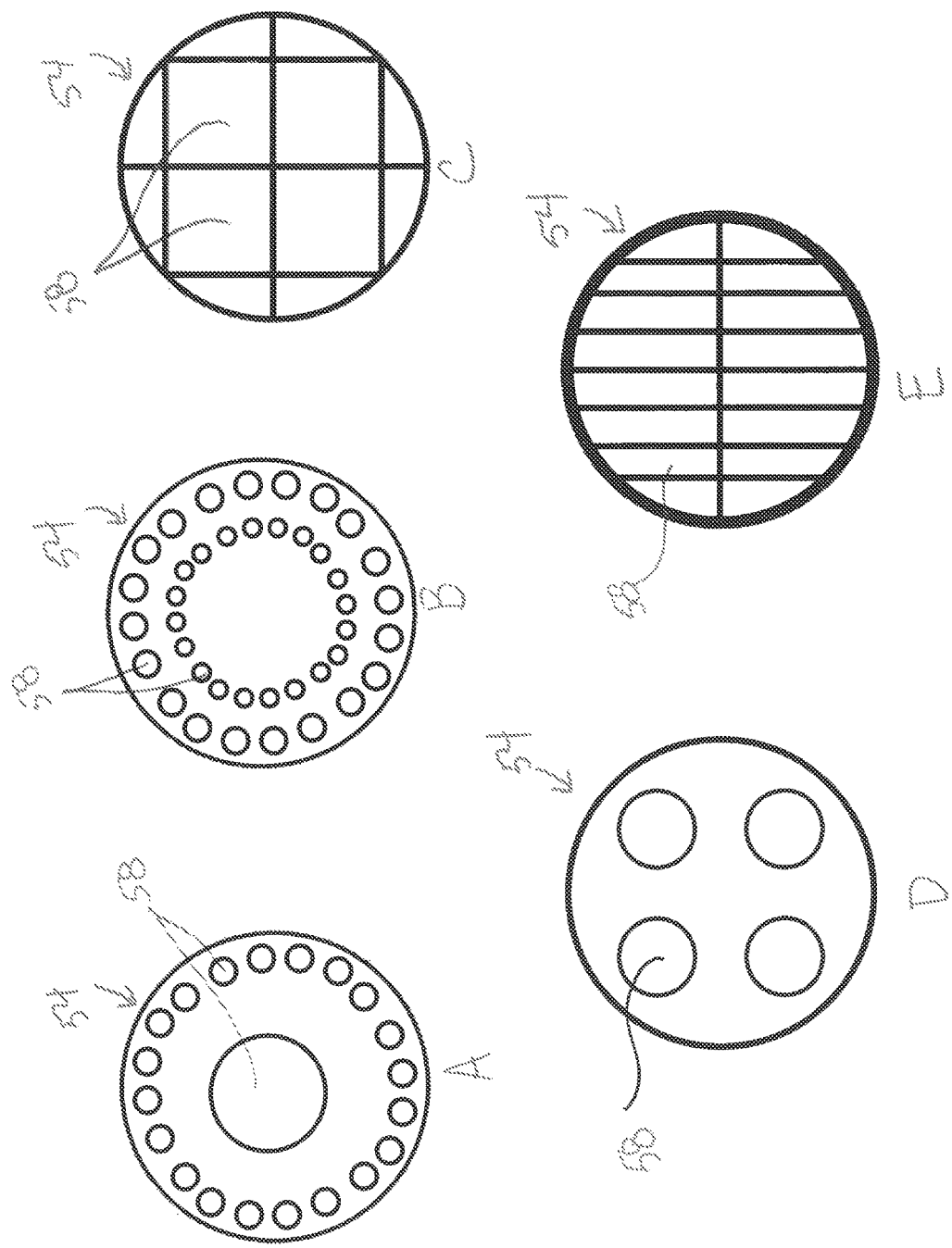
FIG. 6 depicts top plan views of several alternative embodiments of container end apertures, in accordance with some embodiments of the instant disclosure.

FIG. 6 depicts top plan views of several alternative embodiments of container end 54 apertures 58, in accordance with the instant disclosure. FIG. 6A depicts a large centrally positioned aperture 58, with a concentric circle of smaller apertures 58 surrounding the central aperture 58 on the container end 54. FIG. 6B depicts multiple rows of apertures 54 (e.g. two rows of concentrically configured apertures 58) in the container end 54. FIGS. 6C and 6E both show apertures configured as a fence (6C) or mesh (6E) configuration, such that more open space (aperture area) than closed space (end area) is taken up by end 54. FIG. 6D depicts apertures 58 that are symmetrically configured/equidistantly configured on the container end 54. As depicted in the various embodiments of FIG. 6, multiple alternative embodiments for apertures can be utilized in accordance with the present disclosure, such that the resulting container is configured to promote uniform gas transfer/movement into and out of the corresponding container and/or preform(s) retained therein, as the containers and preform(s) travel through the reaction chamber 20).

Figure 7:
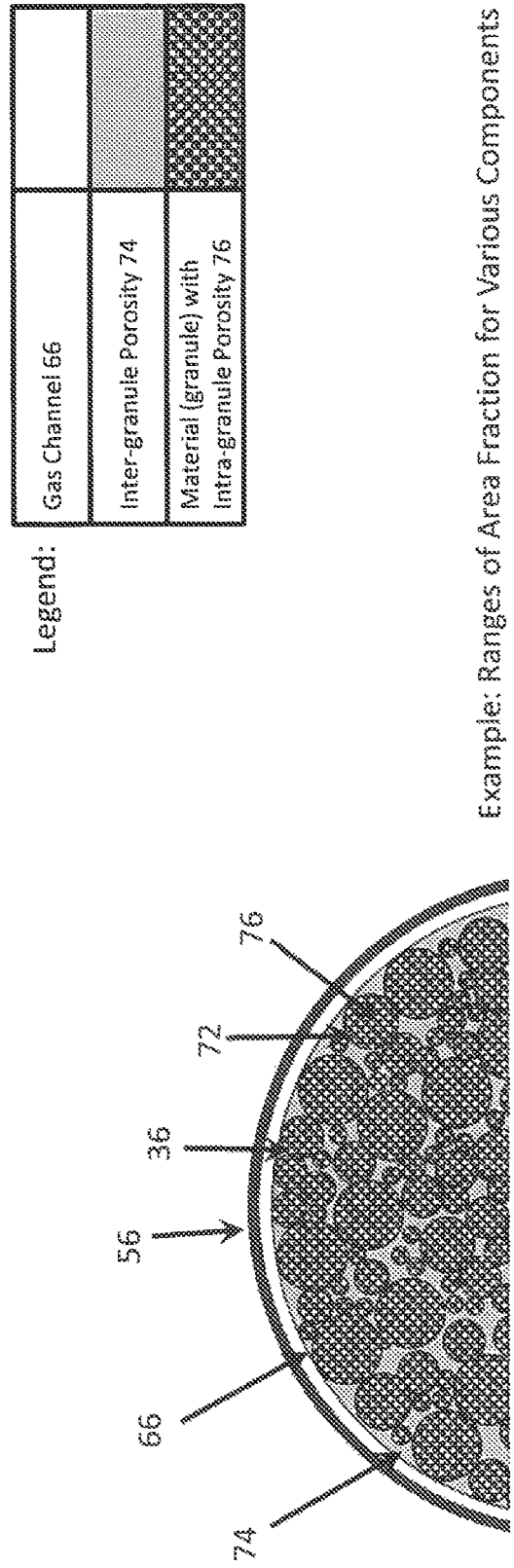
FIG. 7 depicts a partial cut-away side view of a schematic representation of a preform configured within a container, illustrating a gas channel, inter-granular porosity and intra-granular porosity, in accordance with various embodiments of the instant disclosure.

FIG. 7 depicts a partial cut-away side view of a schematic representation of a preform 36 configured within a container 34. As depicted in FIG. 7, there is a gas channel 66 positioned between the sidewall 56 of the container 34 and the preform 36. Also, the preform 36 is depicted as a body configured from a plurality of granules 72. The preform 36 has voids 68 defined as a combination of inter-granular porosity 74 and intra-granular porosity 76. Also, examples of ranges of the area fractions of various components of the preform are provided in the table included in FIG. 7.

In some embodiments, the ceramic powders detailed herein may be used for multiple applications. In some embodiments, the ceramic powders are specifically tailored to be processed via ceramics processing techniques in order to form ceramic products (wherein the ceramic products are tailored for their application, based on the consistent and/or uniform properties of the ceramic powder product).

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

REFERENCE NUMBERS

System 10
Reactor body 12
First end 14
Second end 16
Inner sidewall 18
Reaction chamber 20
Heat source 22
Hot zone 24
Sweep gas inlet 26
Sweep gas 28
Sweep gas outlet 30
Exhaust gas 32
Container 34
Preform 36
Precursor materials 38
Ceramic powder product 40
Staging area 42
Preheat zone 44
First seal 46
Valve 48
Heat source 50
Second seal 52
At least one end (of container) 54
Sidewall (of container) 56
Apertures (on end or container sidewall) 58
Receiving unit 60
Vapor space in container (e.g. defined as the space between the preform(s) and the container end and/or sidewalls) 62
Separator plate (e.g. plenum plate, e.g. configured as a spacer for preform(s) within a single container) 64
Gas channel/at least one opening (e.g. in the preform) 66
Porosity/voids (in preform) 68 (includes e.g. inter-granule and intra-granule, when preform is configured from granules)
Component (e.g. includes container and at least one preform, where the components are configurable in a container assembly (sequentially configured, aligned plurality of containers) 70
Granule 72
Inter-granule porosity 74
Intra-granule porosity 76 (e.g. or intra-preform porosity, if utilizing compacted solid preform, cast preform and/or extrudate preform)

We claim:

1. A method for carbothermically producing a ceramic powder, the method comprising:
    a) preheating at least one container in a staging zone, wherein the at least one container comprises a preform;
        (i) wherein the preform comprises a mixture, wherein the mixture comprises a carbon source and at least one of (a) a metal oxide and (b) boric acid;
        (ii) wherein the preform comprises a plurality of granules, wherein the wherein the plurality of granules define an inter-granular porosity of the preform, wherein the inter-granule porosity is from 0.1 to 0.6 area fraction of the preform based on cross section area of the preform, wherein the plurality of granules are internally porous defining an intra-granular porosity, and wherein the intra-granule porosity is configured to occupy not greater than 0.6 area fraction of the preform based on cross section area of the preform;
    b) moving the at least one container into a reactor body, wherein the reactor body comprises a reaction zone;
    c) carbothermically reacting the preform in the reaction zone thereby producing a ceramic powder, wherein the carbothermically reacting comprises reducing, via the carbon of the preform, at least one of the metal oxide and the boric acid of the preform to form the ceramic powder, wherein the ceramic powder comprises ceramic particles, wherein the ceramic particles are selected from the group consisting of metal carbide particles, metal boride particles, metal nitride particles, and combinations thereof; and
    d) moving the at least one container from the reactor body to a receiving zone.

2. The method of claim 1, comprising flowing, during at least the carbothermically reacting step, a sweep gas into the at least one container.

3. The method of claim 1, wherein the carbothermically reacting step comprises a reaction time, wherein the reaction time is from 0.5 to 12 hours.

4. The method of claim 1 comprising, prior to the preheating step, forming the preform from a precursor mixture, wherein the precursor mixture comprises the carbon source and at least one of the metal oxide and the boric acid.

5. The method of claim 4, wherein the forming comprises at least one of: compacting the precursor mixture, molding the precursor mixture, casting the precursor mixture, and extruding the precursor mixture.

6. The method of claim 5 comprising, after the forming step, processing the preform, wherein the processing comprises at least one of: dehydrating, curing, and demolding of the preform.

7. The method of claim 1 comprising, after the carbothermically reacting step, deagglomerating the ceramic powder.

8. The method of claim 1, wherein the metal oxide is titanium dioxide, and wherein the preform comprises the carbon source and the titanium dioxide.

9. The method of claim 8, wherein the preform comprises the carbon source, the titanium dioxide, and the boric acid.

10. The method of claim 9, wherein the preform comprises 10-35 wt. % of the carbon source, 20-50 wt. % of the titanium dioxide, and 30-70 wt. % of the boric acid.

11. The method of claim 1, wherein the ceramic particles are titanium diboride particles and wherein the ceramic powder is a titanium diboride powder.

* * * * *